United States Patent
Döring et al.

(10) Patent No.: US 10,299,488 B2
(45) Date of Patent: May 28, 2019

(54) PROCESS FOR PRODUCING DAIRY PRODUCTS WITH A DEFINED LACTOSE CONTENT

(71) Applicant: DMK Deutsches Milchkontor GmbH, Zeven (DE)

(72) Inventors: Sven-Rainer Döring, Zeven (DE); Jan Aschemann, Zeven (DE); Thorben Oehlckers, Buchholz (DE)

(73) Assignee: DMK Deutaches Milchkontor GmbH, Zeven (DE)

( * ) Notice: Subject to any disclaimer, the term of this patent is extended or adjusted under 35 U.S.C. 154(b) by 207 days.

(21) Appl. No.: 15/208,177

(22) Filed: Jul. 12, 2016

(65) Prior Publication Data
US 2017/0020153 A1   Jan. 26, 2017

(30) Foreign Application Priority Data
Jul. 25, 2015   (EP) .................................... 15178392

(51) Int. Cl.
A23C 9/12   (2006.01)
A23C 9/142   (2006.01)

(52) U.S. Cl.
CPC .......... *A23C 9/1206* (2013.01); *A23C 9/1422* (2013.01); *A23C 9/1427* (2013.01); *A23C 2210/252* (2013.01)

(58) Field of Classification Search
CPC ... A23C 9/1206; A23C 9/1422; A23C 9/1425; A23C 2210/252
USPC .................... 426/46, 580, 478, 491, 492, 42
See application file for complete search history.

(56) References Cited

U.S. PATENT DOCUMENTS

| 2003/0031754 A1* | 2/2003 | Lange |
| 2005/0196508 A1 | 9/2005 | Wang |
| 2010/0055289 A1 | 3/2010 | Kallioinen et al. |
| 2010/0215828 A1* | 8/2010 | Tossavainen et al. |
| 2011/0003032 A1* | 1/2011 | Harnett et al. |
| 2011/0034685 A1* | 2/2011 | Lefran et al. |
| 2011/0059220 A1 | 3/2011 | Tossavainen et al. |
| 2013/0142904 A1* | 6/2013 | Hoist et al. |
| 2013/0230623 A1* | 9/2013 | Shibakov et al. |
| 2014/0017332 A1* | 1/2014 | Tikanmaki et al. |

FOREIGN PATENT DOCUMENTS

| DE | 23 54 475 A1 | 5/1974 |
| EP | 2 796 051 A1 | 10/2014 |

\* cited by examiner

*Primary Examiner* — Helen F Heggestad
(74) *Attorney, Agent, or Firm* — Dilworth & Barrese, LLP

(57) ABSTRACT

A process for producing dairy products with a defined lactose content is suggested, comprising the following steps:
(a) Ultrafiltration of a starting milk for producing a first permeate P1 and a first retentate R1;
(b) Reverse osmosis of the first permeate P1 for producing a second permeate P2 and a second retentate R2;
(c) Decalcification of the second retentate R2;
(d) Ultrafiltration of the decalcified product of step (c) for producing a third permeate P3 (lactose concentrate) and a third retentate R3 (mineral concentrate);
(e) Mixing the first retentate R1 with such an amount of the third permeate P3 and the third retentate R3 each so that a standardized dairy product with a defined concentration of lactose and salts is obtained.

20 Claims, 1 Drawing Sheet

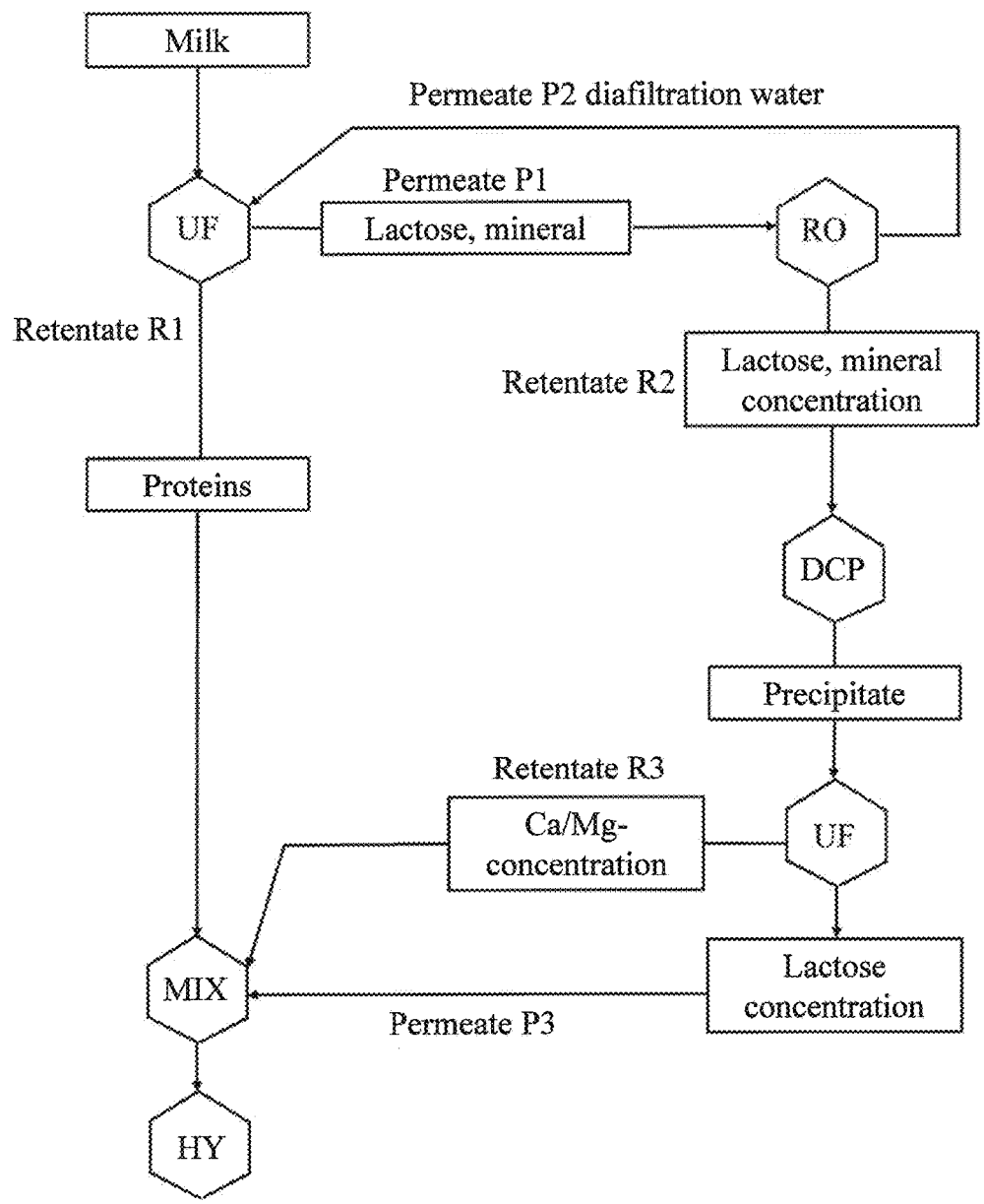

US 10,299,488 B2

PROCESS FOR PRODUCING DAIRY PRODUCTS WITH A DEFINED LACTOSE CONTENT

FIELD OF THE INVENTION

The invention is in the field of lactose-free dairy products and relates to the production of dairy products with reduced, but defined, lactose content and a largely identical mineral composition in comparison with the starting milk, which may be converted into lactose-free products without changing the taste profile of the starting milk.

STATE OF THE ART

During their breastfeeding period, newborn mammals create the enzyme lactase, which breaks down the disaccharide milk sugar into the sugar types D-galactose and D-glucose, which are metabolically usable. In the process of natural weaning from breast milk, the activity of lactase drops to about 5-10% of its activity at the time of birth. This applies to humans and all other mammals alike. Only in populations that had been consuming dairy for a long time a mutation became predominant which has the effect that a sufficient amount of lactase is continued to be created in adulthood (lactase persistence). It is assumed that this is caused by the higher lactase activity which provided these groups with a selective advantage (mineral substances, nutritional value).

In the case of deficient lactase activity in humans, unbroken milk sugar moves as far as the colon where it is absorbed and fermented by intestinal bacteria. Lactic acid as well as methane and hydrogen are formed as fermentation products. The gases cause, inter alia, bloating, and the osmotically active lactic acid causes an increased flow of water into the bowels (osmotic diarrhea).

In Asia and Africa, the lack of lactase persistence or lactose intolerance affects the majority of the adult population (90% or more), in Western Europe, Australia, and North America it is 5-15% (in the case of fair-skinned people). In Germany, 15-25% of the total population are estimated to suffer from a milk sugar intolerance. The reason for a lactose intolerance is a congenital enzyme deficiency, in which the relevant enzymes that break down milk sugar into its components and decompose it are missing. In the past years, at least the awareness that there is a context between the symptoms mentioned and the presence of lactose, particularly in dairy products, has strongly increased. This resulted in a great demand for products that are low in lactose, or better, lactose-free.

Various processes are known in the state of the art, by means of which lactose is either separated from dairy products and further processed as a by-product, or decomposed by adding enzymes as appropriate.

The subject matter of EP 1503630 B1 (VALIO) is, for example, a process for producing lactose-free products, wherein the starting milk is initially subjected to ultrafiltration. The first permeate obtained herein is nanofiltered, in the process of which lactose is discharged via the second retentate, and the monovalent salts (sodium, potassium) enter into the second permeate. The latter is concentrated by means of reverse osmosis and the third retentate such obtained is admixed to the first retentate again before subjecting it to hydrolysis in order to enzymatically decompose lactose. The process, however, has two substantial disadvantages: it is impossible to control the lactose content of the retentate which is hydrolyzed, as it automatically adjusts to a very low value as a result of the ultrafiltration conditions. As a result, only small amounts of sugar are available for breakdown during hydrolysis, so that a lactose-free milk is obtained, which, however, is much less sweet and has a less pleasing taste than the starting milk. Further, this process allows only alkaline salts to be fed back into the milk. In order to more or less achieve the taste profile of the original milk, divalent salts from other sources must be added again. In sum, in any case, a product is obtained which only approximately corresponds to the desired taste profile of the original milk.

A similar path is suggested in EP 2207428 B1 (ARLA): here, milk is also initially subjected to ultrafiltration, whereby the permeate is then nanofiltered. The permeate of nanofiltration is mixed with the retentate of ultrafiltration and is subsequently hydrolyzed. However, this process has the same disadvantages as the Valio process with respect to the taste profile of the resulting products.

The object of the present invention is therefore to provide a lactose-depleted dairy composition on the basis of whole milk, skimmed milk or standardized milk, typically having between 4 and 5 wt % lactose, which, however, has the same or substantially the same mineral composition as the starting milk, in order to be able to produce lactose-free products in this manner, the taste profile of which corresponds to the one of the starting milk.

SUMMARY OF THE INVENTION

A first subject-matter of the present invention relates to a process for producing dairy products with a defined lactose content, for example, about 0.5 to about 2.5 wt %, comprising the following steps:
(a) Ultrafiltration of a starting milk for producing a first permeate P1 and a first retentate R1;
(b) Reverse osmosis of the first permeate P1 for producing a second permeate P2 and a second retentate R2;
(c) Decalcification of the second retentate R2;
(d) Ultrafiltration of the decalcified product of step (c) for producing a third permeate P3 and a third retentate R3;
(e) Mixing the first retentate R1 with such an amount of the third permeate P3 and the third retentate R3 each, so that a standardized dairy product with a defined concentration of lactose and salts is obtained.

A further subject-matter of the present invention comprises the process described above, followed by the following additional step:
(f) Hydrolysis of the standardized dairy product of step (e) while adding such an amount of lactase that the residual amount of lactose still contained in the product is completely broken down into glucose and galactose.

This embodiment of the invention thus relates to the case in which the lactose content in the milk is eventually zero.

Surprisingly, it was found that the process of the invention fully complies with the described requirement profile. In doing so, the milk is initially separated into a protein-rich/low-lactose and a lactose-rich/low-protein fraction, the latter is concentrated and then separated into a salt concentrate and a lactose concentrate, and the two concentrates are added to the first protein-rich/low-lactose fraction in such amounts ("standardization") that the composition of the starting milk is obtained again, the amount of lactose of which, however, is significantly reduced. During backmixing, the lactose content is, preferably, adjusted to a quarter of the initial value. In the subsequent hydrolysis step, one molecule of lactose is broken down into one molecule of glucose and one molecule of galactose, respectively. Studies on the relative sweetening power (rS) of different carbohydrates based on saccharose (cf. Noeske, 1996) showed that both glucose (rS=64) and galactose (rS=60) each had about twice the sweetening power of lactose (rS=30). If the amount of lactose is thus reduced to a quarter of the initial value before hydrolysis, this just results in the amount of sugar required to obtain the same sweetening power as in the starting milk. As a result, the milk does not taste sweeter than before. As a result of adding the milk's own salts to the milk instead of other salts during standardization, after hydrolysis, in sum, a product is obtained which is lactose-free, but does not differ from the starting milk in its composition, thus having the same taste impression.

It is of course also possible to adjust a very low lactose content by means of this process—for example, by adding no, or only very little, lactose concentrate (permeate P3) to the first retentate R1. Accordingly, an unsweetened, very low-calorie milk is obtained after hydrolysis.

BRIEF DESCRIPTION OF THE DRAWING

The present invention will be described in greater detail with reference to the accompanying drawing which schematically illustrates a flow chart of the present invention.

DESCRIPTION OF THE INVENTION

1. Ultrafiltration

In the first process step, the starting milk, which may be whole milk, skimmed milk or standardized milk of a lactose content in the range of about 3 to about 5 wt % and, preferably, about 4 to about 4.5 wt %, is separated into a protein-rich and low-lactose fraction and into a low-protein and lactose-rich fraction.

Ultrafiltration belongs to the filtration processes in the field of membrane technology, by means of which macromolecular substances and small particles may be separated from a medium and concentrated. Depending on the degree of separation, microfiltration, ultrafiltration and nanofiltration are distinguished. If the exclusion limit (also called "Cut-off") is 100 nm or more, this is referred to as microfiltration. If the exclusion limit is in the range between 2 to 100 nm, this is referred to as ultrafiltration. In the case of nanofiltration the exclusion limit is below 2 nm. Each of these cases is a purely physical, i.e. mechanical, membrane separation process functioning according to the principle of mechanical size exclusion: all particles in the fluids larger than the membrane pores are retained by the membrane. The driving force in both separation processes is the differential pressure between the inlet and the outlet of the filter surface, which is between 0.1 and 10 bar.

The exclusion limits of nanofiltration membranes are also specified in the form of NMWC (Nominal Molecular Weight Cut-Off, also called MWCO, Molecular Weight Cut Off, unit: Dalton). It is defined as the minimum molecular weight of globular molecules which are retained to 90% by the membrane. In practice, the NMWC should be at least 20% lower than the molecular mass of the molecule to be separated. Further qualitative statements about filtration may be made using the flux (water value) (transmembrane flux or passage rate). In an ideal case, it behaves proportionally to the transmembrane pressure and reciprocally to the membrane resistance. These quantities are determined both by the properties of the membrane used and also by concentration polarization and the fouling which may occur. The passage rate is based on 1 $m^2$ membrane surface. Its unit is $l/(m^2 h\ bar)$.

In a preferred embodiment of the process of the invention, ultrafiltration is performed while adding such an amount of diafiltration water that a first retentate with a dilution factor of about 5 to about 20 is obtained and, preferably, about 8 to about 12 is obtained. Preferably, the diafiltration water is taken from the second permeate P2 of the subsequent reverse osmosis step.

Membranes with a pore diameter in the range of about 1,000 to about 50,000 and, preferably, of about 5,000 to about 25,000 Dalton have proved to be particularly suitable for ultrafiltration. In contrast to this, for example, nanofiltration prefers pore diameters in the range of 100 to 1,000 and, preferably, about 150 to 800 Dalton.

The material of the filter surface may be made of stainless steel, polymer materials, ceramics, aluminum oxide or textile fabric. There are different forms of filter elements: cartridge filters, flat membranes, spiral wound membranes, bag filters and hollow fiber membrane modules, which are all principally suitable within the meaning of the present invention. However, spiral wound membranes made of polymer materials, or cartridge filters made of ceramics or aluminum oxide are preferably used, whereby the first embodiment has been proved particularly suitable for ultrafiltration and the second one for nanofiltration.

Ultrafiltration within the meaning of the present invention may be performed "hot" or "cold", i.e. in the temperature range of about 4 to about 55° C. It is, however, preferable to operate at temperatures in a low range from about 4 to about 25° C. and, particularly, from about 8 to about 18° C.

Reverse Osmosis

The first permeate P1 of the nanofiltration step is practically free of proteins, however, it contains glucose, galactose and minerals in a concentration that is practically unchanged relative to the one of the starting milk. In the following reverse osmosis step, the amount of these two components is concentrated.

Reverse osmosis is a physical method for concentrating substances that are dissolved in liquids, wherein the pressure of the natural osmosis process is reversed. The medium in which the concentration of a particular substance is to be reduced is separated by a semipermeable membrane from the medium in which the concentration is to be increased. The latter is subjected to a pressure that must be higher than the pressure created by the osmotic requirement to establish a concentration equilibrium. In doing so, the molecules of the solvent may travel against their "natural" osmotic expansion direction. By this method they are pressed into the compartment where dissolved substances are present in a lower concentration.

The osmotic membrane which only allows the carrier liquid (solvent) to pass, retaining the dissolved substances (solutes), must be able to withstand these high pressures. If the difference in pressure more than equalizes the osmotic gradient, the solvent molecules will pass through the membrane just as through a filter, while the remaining molecules are retained. In contrast to a classic membrane filter, osmosis membranes do not possess continuous pores. Ions and molecules rather travel through the membrane by diffusing through the membrane material.

The osmotic pressure increases with increasing difference in concentration. If the osmotic pressure becomes equal to the pressure applied, the process will stop. Then an osmotic equilibrium is present. A continuous discharge of the concentrate may prevent this. In the case of the concentrate outlet, the pressure is either controlled by a pressure regulator or used by a pressure exchanger in order to create the pressure required in the inlet of the system. Pressure exchangers very effectively reduce the operating cost of a reverse osmosis plant by recovering energy. The energy input per cubic meter of water is 4 to 9 kWh. Preferably, the concentration factor in the process of the invention is about 2.5 to about 5 and, particularly, about 3 to about 4.

Crystallization (precipitation) of the solutes in the membranes must be prevented. This may be achieved by the addition of anti-scaling means or acids. Herein, anti-scaling means are polymer compounds on the basis of phosphate or maleic acids, which envelope the forming crystals, thus preventing the forming of crystalline precipitations on the membrane. However, cleaning of the membrane may still remain necessary. Additionally, in order to prevent the membrane from damage, filters may be set up upstream. A fine mesh filter may prevent mechanical damage, an activated carbon filter may prevent chemical damage (e.g., by chlorine).

During reverse osmosis, a second permeate is obtained, which substantially only represents diafiltration water which can be fed back into the ultrafiltration step, and a retentate in which lactose and minerals are concentrated, and which has a dry matter content in the order of about 15 to about 20 wt %.

Decalcification

In order to obtain divalent ions from the concentrate of the reverse osmosis step, the second retentate R2 is initially adjusted to an approximately neutral pH value in the range of 6 to 8 by adding bases, and such an amount of a solution of a water-soluble calcium or magnesium salt is added to the minerals, which substantially constitute soluble phosphates, that slightly soluble Ca/Mg salts are precipitated. NaOH, an aqueous preparation of calcium/magnesium chloride, and alkali hydroxide or calcium hydroxide are used to adjust the pH value and to carry out precipitation. In principle, also other alkaline or alkaline-earth bases may be used to adjust the pH value, such as, for example, —KOH. Also the nature of the precipitated salt itself is uncritical, for example, also barium salts may be precipitated. However, the use of calcium and magnesium salts has the advantage that the precipitation agent is inexpensive and the salts have a very low solubility product, which means that precipitation is substantially complete. Demineralisation is performed in stirred tanks also without adding precipitation agents, whereby it has proved to be beneficial to set a temperature in the range of about 50 to 90 and, preferably, of about 80° C. Precipitation time is typically about 10 to 60 and, preferably, about 15 to 20 min; however, these indications are intended to merely be a rough guide, as lower temperatures require longer reaction times and verse versa.

2. Ultrafiltration

The precipitate of the decalcification step is fed into a second ultrafiltration step, for which, in principle, the same process conditions apply as described above. It is preferable to perform ultrafiltration in cold conditions; it is, however, also possible to feed the hot precipitate to the membrane without further, or only slight, cooling. Hereby a third retentate R3 is obtained, substantially containing calcium/magnesium salts, i.e. about 90 wt %, and having a dry matter content of about 8 to about 15 wt %. Analogously, a third permeate P3 is obtained, having a dry matter content of about 15 to about 25 wt % and, preferably, about 15 to about 20 wt % and substantially containing lactose and, in addition, the alkaline salts.

Mixing

The mixing step serves the purpose of producing a standardized dairy product, from which lactose is completely removed subsequently by further hydrolysis. In doing so, defined amounts of lactose and minerals are added to the protein-rich first retentate obtained in the first step. It is particularly intended to obtain a product which has only about 25% lactose relative to the starting milk in order to obtain the same sweetness after hydrolysis. Also the addition of minerals is pursued with the intention of readjusting the original salt concentration and salt composition in order to maintain the taste impression of the original milk.

In a specific embodiment, the process of the invention is, therefore, further characterized in that
(i) such an amount of the lactose concentrate (permeate P3) is added to the first retentate R1 that a lactose concentration of about 0.5 to about 2.5 wt % and, preferably, of about 0.8 to 1.8 wt %—based on the resulting standard milk—is obtained, and/or
(ii) such an amount of the mineral concentrate (retentate R3) is added to the first retentate R1 that a mineral concentration of about 0.6 to about 1.0 wt % and, preferably, of about 0.8 to 0.9 wt %—based on the resulting standard milk—is obtained, and/or
(iii) such an amount of the lactose concentrate (permeate P3) and the mineral concentrate (retentate R3) are added to the first retentate R1 that by this dilution a protein concentration of about 3.5 to about 4.0 wt % and, preferably, of about 3.7 to 3.9 wt %—based on the resulting standard milk—is obtained.

Hydrolysis

Lactose belongs to the group of disaccharides and consists of the two molecules D-galactose and D-glucose, which are bonded by a β-1,4-glycosidic bond.

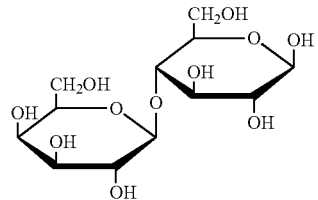

In order to perform a decomposition into the two sugar components, the enzyme lactase (also referred to as LPH or LCT) is added to lactose. Hydrolysis is, preferably, performed in a stirred tank with a continuous inlet and outlet as well as a dosing device for adding the enzyme and a valve arranged at the bottom of the reactor for discharging the deactivated enzyme which deposits in the course of time. It has proved to be advantageous to use an efficient enzyme concentration of about 180,000 to 250,000 FCC units of lactase per kg of lactose to be hydrolyzed, and to perform the reaction at temperatures in the range of about 4 to about 65° C. and, preferably, in the range of 20 to 30° C. and with a slightly acid pH value of about 5 to 6.

INDUSTRIAL APPLICATION

Another subject-matter of the invention relates to the use of the standardized milk described herein as a starting material for producing lactose-free dairy products.

REFERENCE SIGNS IN THE FIGURE

The process of the invention is schematically summarized in FIG. 1. Here, the abbreviations mean:
UF=Ultrafiltration
RF=Reverse osmosis DCP=Decalcification
MIX=Mixing
HY=Hydrolysis

EXAMPLES

Example 1

100 kg milk of the following composition

| MILK | Amount [wt %] |
|---|---|
| Lactose | 4.0 |
| Proteins | 3.5 |
| Minerals | 0.8 | was subjected to a first ultrafiltration step at 10° C. while adding diafiltration water. The dilution factor was 10, whereby a protein-rich first retentate R1 was obtained as an intermediate product having the following composition:

| RETENTATE R1 | Amount [wt %] |
|---|---|
| Lactose | 0.4 |
| Proteins | 11.0 |
| Minerals | 0.08 |

Simultaneously, a low-protein first permeate P1 was obtained, having the following composition:

| PERMEATE P1 | Amount [wt %] |
|---|---|
| Lactose | 4.0 |
| Proteins | <0.1 |
| Minerals | 0.8 |

The first permeate P1 was subjected to reverse osmosis at 10° C. with a concentration factor of 3.5. In doing so, a second permeate P2 was obtained, which practically only consisted of (diafiltration) water, which was fed back into the ultrafiltration step. The second lactose-rich retentate R2 obtained in the reverse osmosis step had a dry matter content of 18 wt % and the following composition:

| RETENTATE R2 | Amount [wt %] |
|---|---|
| Lactose | 15.5 |
| Proteins | <0.1 |
| Minerals | 2.0 |

The retentate R2 was heated to about 80° C. for about 20 min, and the phosphates contained therein were precipitated as Ca/Mg phosphate by adding calcium/magnesium chloride. The precipitate with the supernatant solution was subsequently cooled down to about 25° C. and subjected to a second ultrafiltration step, whereby a third retentate R3 with a dry matter content of 10 wt %-90 wt % of which consisted of calcium and magnesium salts—was obtained, as well as a third permeate P3 with a dry matter content of 17 wt % of the following composition:

| PERMEATE P3 | Amount [wt %] |
|---|---|
| Lactose | 16.0 |
| Proteins | 0.0 |
| Minerals (Na, K) | 1.0 |

Subsequently, such an amount of the lactose concentrate (permeate P3) and the salt concentrate (retentate R3) was added to the first retentate R1 that a standardized milk of the following composition resulted:

| STANDARD MILK | Amount [wt %] |
|---|---|
| Lactose | 1.0 |
| Proteins | 3.5 |
| Minerals | 0.8 |

The standardized milk thus had the same protein content and the same amount and composition of minerals as the starting milk, but only about one quarter of the amount of lactose. In the subsequent hydrolysis step, 1.0 wt % lactose were transformed to 2.0 wt % glucose and galactose. In this manner, a lactose-free milk was obtained, which had the same sweetness and the same taste profile as the original milk according to the different sweetening power of the present carbohydrates.

The invention claimed is:

1. A process for producing dairy products with a defined lactose content, comprising the following steps:
    (a) subjecting a starting milk to ultrafiltration for producing an ultrafiltration first permeate P1 and an ultrafiltration first retentate R1;
    (b) subjecting said ultrafiltration first permeate P1 to reverse osmosis for producing a second permeate P2 and a second retentate R2;
    (c) subjecting said second retentate R2 to decalcification;
    (d) subjecting the product of step (c) to ultrafiltration for producing an ultrafiltration third permeate P3 (lactose concentrate) and an ultrafiltration third retentate R3 (mineral concentrate);
    (e) mixing the ultrafiltration first retentate R1 with an amount of the ultrafiltration third permeate P3 and the ultrafiltration third retentate R3 each such that a standardized dairy product is obtained with defined concentrations of lactose and salts or minerals; and
    (f) hydrolyzing the standardized dairy product of step (e) while adding an amount of lactase such that a residual amount of lactose still contained in the product is completely broken down into glucose and galactose.

2. The process of claim 1, comprising using whole milk, skimmed milk or standard milk as starting milk.

3. The process of claim 1, comprising using a starting milk having a lactose content in the range of about 3 to about 5 wt %.

4. The process of claim 1, wherein ultrafiltration is performed while adding an amount of diafiltration water such that the ultrafiltration first retentate R1 with a dilution factor of about 5 to about 15 is obtained.

5. The process of claim 4, wherein the diafiltration water is obtained from the second permeate P2 obtained in the reverse osmosis step.

6. The process of claim 1, wherein the two ultrafiltration steps are performed using membranes having a pore diameter of about 1,000 to about 50,000 Dalton.

7. The process of claim 1, wherein the two ultrafiltration steps are performed at temperatures in the range of about 4 to 25° C.

8. The process of claim 1, wherein said reverse osmosis is performed with a concentration factor of about 2.5 to about 5.

9. The process of claim 1, wherein said decalcification is performed by adding calcium and/or magnesium salts.

10. The process of claim 1, wherein the decalcification is performed at temperatures of about 50 to about 90° C. and/or reaction times of about 10 to about 60 minutes.

11. The process of claim 1, wherein an amount of said ultrafiltration third permeate P3 is added to the ultrafiltration first retentate R1 such that a lactose concentration of from about 0.5 to about 2.5 wt %—based on the resulting standard milk—is obtained.

12. The process of claim 1, wherein an amount of said ultrafiltration third retentate R3 is added to the ultrafiltration first retentate R1 such that a mineral concentration of about 0.6 to about 1.0 wt %—based on the resulting standard milk—is obtained.

13. The process of claim 1, wherein amounts of said ultrafiltration third permeate P3 and said ultrafiltration third retentate R3 are added to the ultrafiltration first retentate R1 such that by the dilution, a protein concentration of about 3.5 to about 4.0 wt %—based on the resulting standard milk—is obtained.

14. A process for producing dairy products with a defined lactose content, consisting of the following steps:
   (a) subjecting a starting milk to ultrafiltration for producing a first permeate P1 and a first retentate R1;
   (b) subjecting said first permeate P1 to reverse osmosis for producing a second permeate P2 and a second retentate R2;
   (c) subjecting said second retentate R2 to decalcification;
   (d) subjecting the product of step (c) to ultrafiltration for producing a third permeate P3 (lactose concentrate) and a third retentate R3 (mineral concentrate);
   (e) mixing the first retentate R1 with an amount of the third permeate P3 and the third retentate R3 each such that a standardized dairy product is obtained with defined concentrations of lactose and salts or minerals; and
   (f) hydrolyzing the standardized dairy product of step (e) while adding an amount of lactase such that a residual amount of lactose still contained in the product is completely broken down into glucose and galactose.

15. The process of claim 14, wherein the starting milk has a lactose content in the range of about 3 to about 5 wt % and is selected from the group consisting of whole milk, skimmed milk and standard milk.

16. The process of claim 14, wherein ultrafiltration is performed while adding an amount of diafiltration water such that the first retentate R1 with a dilution factor of about 5 to about 15 is obtained.

17. The process of claim 14, wherein the two ultrafiltration steps are performed using membranes having a pore diameter of about 1,000 to about 50,000 Dalton at temperatures in the range of about 4 to 25° C.

18. The process of claim 14, wherein said reverse osmosis is performed with a concentration factor of about 2.5 to about 5.

19. The process of claim 14, wherein the decalcification is performed by adding calcium and/or magnesium salts at temperatures of about 50 to about 90° C. and/or reaction times of about 10 to about 60 minutes.

20. The process of claim 14, wherein an amount of said third permeate P3 is added to the first retentate R1 such that a lactose concentration of from about 0.5 to about 2.5 wt % based on the resulting standard milk is obtained; an amount of said third retentate R3 is added to the first retentate R1 such that a mineral concentration of about 0.6 to about 1.0 wt % based on the resulting standard milk is obtained; and amounts of said third permeate P3 and said third retentate R3 are added to the first retentate R1 such that by the dilution, a protein concentration of about 3.5 to about 4.0 wt % based on the resulting standard milk is obtained.

\* \* \* \* \*